United States Patent
Graber

(10) Patent No.: US 7,338,063 B2
(45) Date of Patent: Mar. 4, 2008

(54) TRAILER DAMPING APPARATUS AND TRAILER UTILIZING SAME

(76) Inventor: John D. Graber, R.R. 1, Box 460, Odon, IN (US) 47562

( * ) Notice: Subject to any disclaimer, the term of this patent is extended or adjusted under 35 U.S.C. 154(b) by 261 days.

(21) Appl. No.: 11/104,937

(22) Filed: Apr. 13, 2005

(65) Prior Publication Data
US 2006/0232042 A1    Oct. 19, 2006

(51) Int. Cl.
B60D 1/30 (2006.01)
(52) U.S. Cl. .................. 280/483; 280/439
(58) Field of Classification Search ........... 280/483, 280/439, 441.2
See application file for complete search history.

(56) References Cited
U.S. PATENT DOCUMENTS

| | | | |
|---|---|---|---|
| 2,500,686 A * | 3/1950 | Jontz | 280/476.1 |
| 2,844,265 A * | 7/1958 | Clark | 414/481 |
| 3,659,876 A | 5/1972 | Melton | |
| 3,788,673 A | 1/1974 | Gloege | |
| 4,077,650 A | 3/1978 | Leach, Jr. | |
| 4,283,073 A | 8/1981 | Gostomski et al. | |
| 4,792,154 A | 12/1988 | Kerst et al. | |
| 5,639,106 A | 6/1997 | Vitale et al. | |
| 5,683,094 A | 11/1997 | Gullickson | |
| 5,785,341 A | 7/1998 | Fenton | |
| 5,823,560 A | 10/1998 | Van Vleet | |
| 5,868,415 A | 2/1999 | Van Vleet | |
| 5,947,503 A | 9/1999 | Tompkins | |
| 5,964,476 A | 10/1999 | Maines | |
| 6,170,849 B1 | 1/2001 | McCall | |
| 6,494,478 B1 | 12/2002 | MacKarvich | |
| 6,746,037 B1 | 6/2004 | Kaplenski et al. | |
| 6,854,757 B2 * | 2/2005 | Rehme | 280/488 |

\* cited by examiner

Primary Examiner—Kevin Hurley
(74) Attorney, Agent, or Firm—Liell & McNeil

(57) ABSTRACT

A damping apparatus for a gooseneck trailer and a gooseneck trailer are provided. The damping apparatus includes an inner shaft and an outer shaft reciprocable about the inner shaft. A first plate is coupled with the outer shaft. A second plate may be coupled with the first plate, and a damping member disposed between the first and second plates to damp relative movement between the inner and outer shafts.

9 Claims, 2 Drawing Sheets

TRAILER DAMPING APPARATUS AND TRAILER UTILIZING SAME

TECHNICAL FIELD

The present disclosure relates generally to damping apparatuses for trailers, and more particularly to such an apparatus having first and second plates movable about a shaft and a damping member positioned between the plates to dampen movements between a trailer and a tow vehicle.

BACKGROUND

The modern economy is dependent in large part upon over-the-highway transportation of commodities and other goods. It is impossible to travel far without witnessing commercial transportation of food, machines, raw materials and even domestic livestock. A common means for both short and long distance transportation involves a transport trailer coupled to a tow vehicle. "Gooseneck" trailers, having a bed with conventional wheels upon which to secure the load and an arching neck for coupling with a tow vehicle are often used for transporting relatively large and heavy loads, particularly via pick-up trucks having bed mounted components configured to receive and couple with the neck.

Potholes and other damaged, uneven or unimproved portions of roads can present a challenge to transporting loads with such trailers. Because the trailer body must be coupled with the tow vehicle, jarring, bouncing and various other vibrations or motions may be transferred between the trailer and the tow vehicle. It is well known that rough transport of goods or animals can damage/injure the goods or animals, and increase wear on various components of the trailer and tow vehicle. It is also well known that mechanical "noise" in any vehicle system can reduce fuel economy.

Over the years, a great many designs have been developed which attempt to limit the transference of jolts and vibrations between a trailer and a tow vehicle. Numerous systems are known ranging from combination pneumatic and hydraulic damping apparatuses for large semi truck trailers to relatively smaller systems wherein a conventional tow bar for a passenger car is equipped with moving parts and energy absorbing means to reduce certain shocks in the system.

One example of a trailer hitch design directed to damping is described in U.S. Pat. No. 5,683,094 to Gullickson entitled, "Universal, Energy-Absorbent Trailer Hitch." Gullickson utilizes an elastomeric cushion member adjacent a trailer ball and positioned within a housing. While Gullickson appears to describe one workable design, the apparatus is relatively complex and requires use of the specialized cushion.

Another known design for a trailer hitch with a damping function is described in U.S. Pat. No. 6,868,415 to Van Fleet, entitled "Cushion Coupler." The Van Fleet design is also relatively complex, utilizing a system of multiple housing assemblies with specialized parts.

The present disclosure is directed to overcoming shortcomings associated with earlier designs.

SUMMARY OF THE INVENTION

In one aspect, a damping apparatus for a trailer is provided. The damping apparatus includes, an inner shaft and an outer shaft reciprocable about the inner shaft. A first plate is coupled with the outer shaft. A second plate is further provided and a damping member is disposed between the first and second plates to damp relative movement between the inner and outer shafts.

In another aspect, a trailer coupling is provided. The coupling includes an inner shaft having a first end and a second end. A ball coupling mechanism is connected with the inner shaft at the first end. An outer shaft is provided which is reciprocable about the inner shaft. A first plate is provided which is coupled with the outer shaft, whereas a second plate is coupled with the first plate and displaced from the second end of the inner shaft. A damping member is disposed between the plates to damp relative motion between the inner shaft and outer shaft.

In still another aspect, a gooseneck trailer is provided. The gooseneck trailer includes a trailer body, and a trailer neck connected with the trailer body for coupling the same with a tow vehicle. A damping apparatus is connected to the trailer neck, the damping apparatus including a shaft and a set of spaced apart coupled plated configured to move relative to the shaft. One of the plates is coupled with the trailer neck. The damping apparatus further includes at least one damping member disposed between the plates to damping movements between the trailer neck and the shaft.

DETAILED DESCRIPTION

Figure 1:
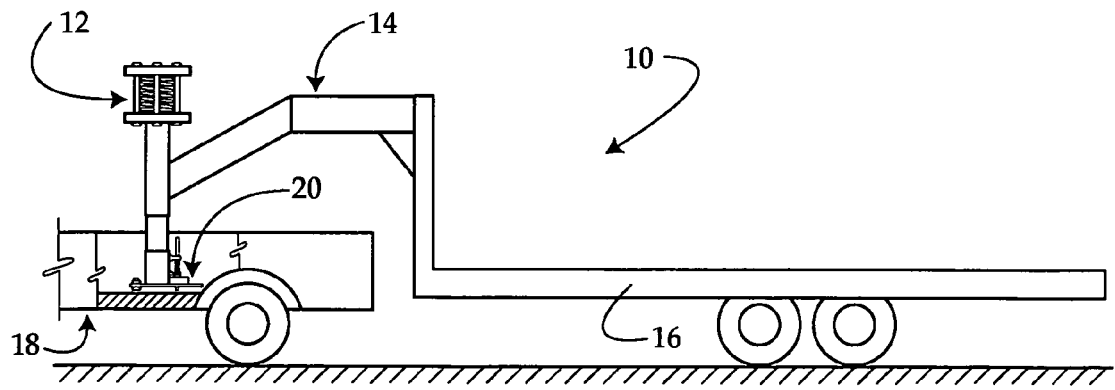
FIG. 1 is a side diagrammatic view of a gooseneck trailer according to the present disclosure.

Referring to FIG. 1, there is shown a gooseneck trailer 10 according to the present disclosure. Trailer 10 includes a trailer body 16 having a neck 14 coupling body 16 with a tow vehicle 18, via a ball coupling apparatus 20. A damping apparatus 12 is coupled with trailer 10 to damp jolts, vibrations, etc. between trailer 10 and tow vehicle 18 during travel.

Figure 2:
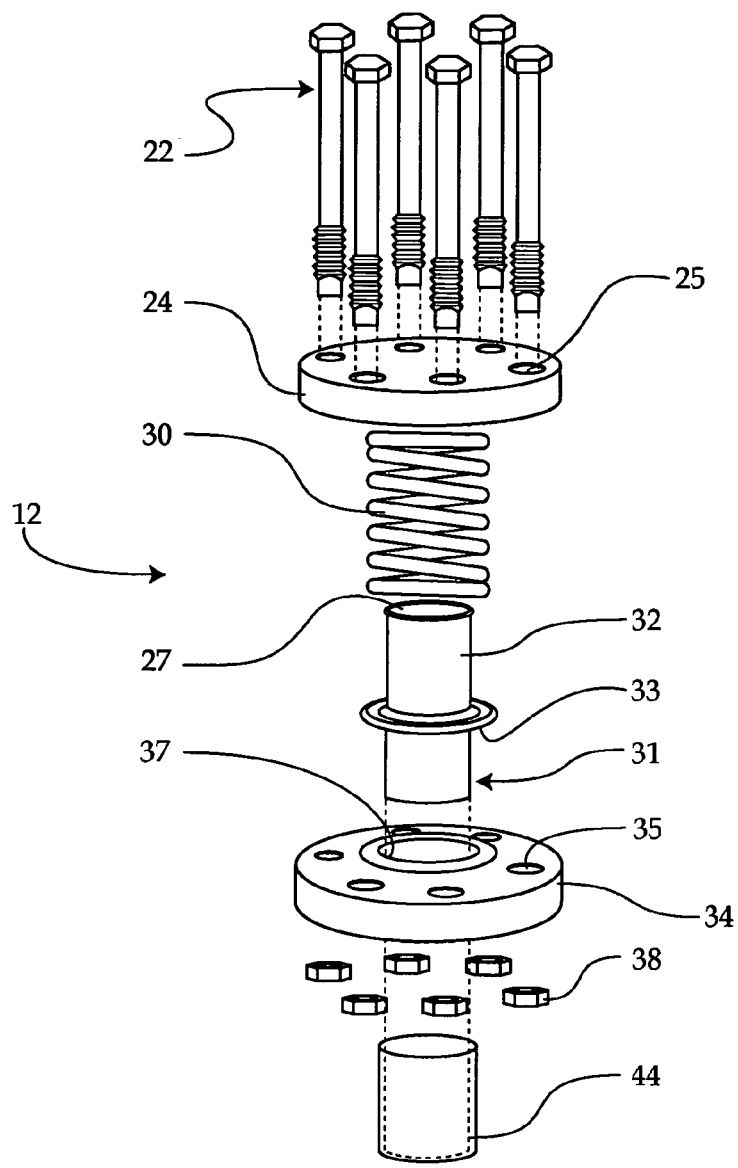
FIG. 2 is an exploded isometric view of a trailer damping apparatus according to the present disclosure.
Figure 3:
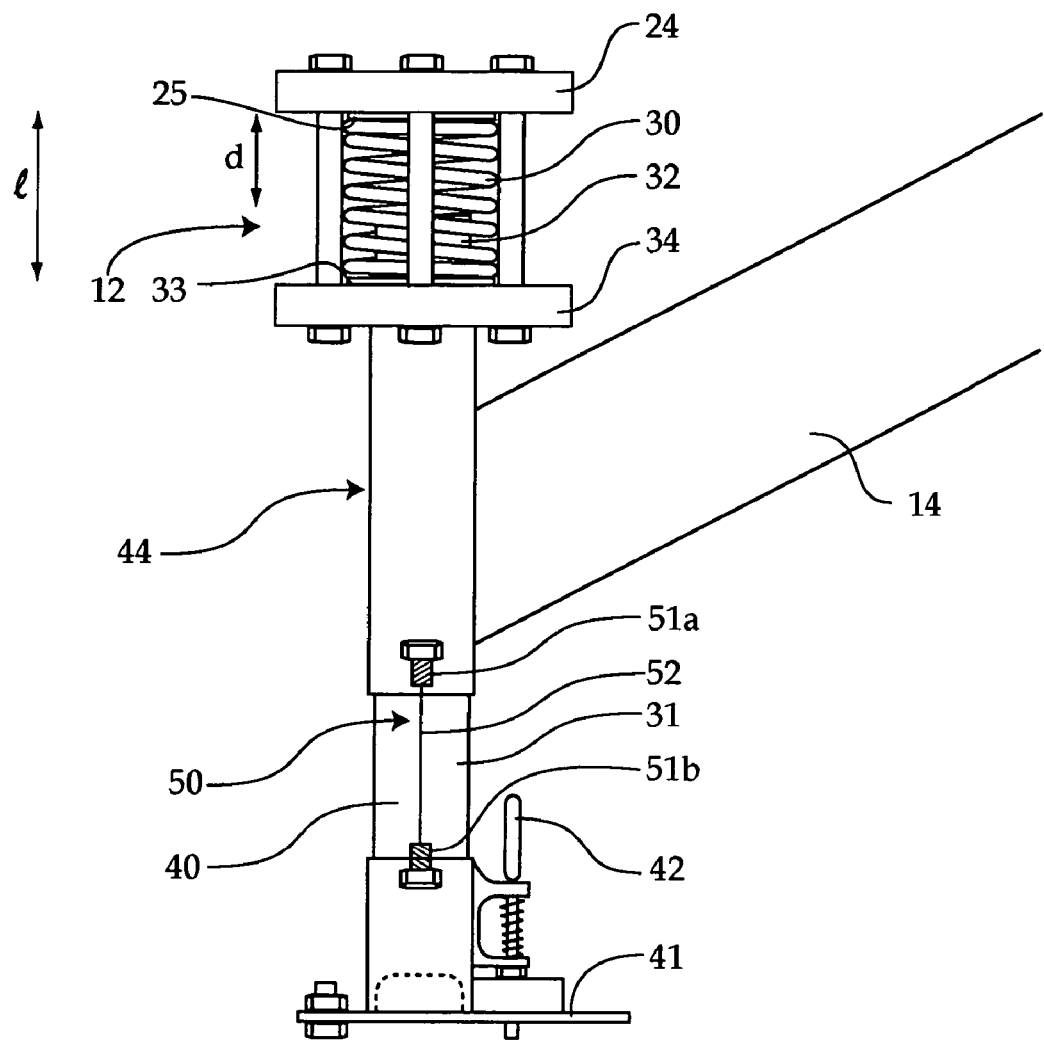
FIG. 3 is a side diagrammatic view of a trailer damping apparatus according to the present disclosure.

Referring also to FIGS. 2 and 3, there are shown exploded and assembled views, respectively, of damping apparatus 12. Damping apparatus 12 may include an inner shaft 31 and an outer shaft 44 reciprocable about inner shaft 31, in a reciprocation direction "l". A first plate 34 is provided and may be coupled with outer shaft 44. As shown in FIG. 3, outer shaft 44 may be coupled with neck 14 of trailer 10, for example welded thereto. First plate 34 may include a central aperture 37 positionable about inner shaft 31. A second plate 24 may also be provided and spaced apart from first plate 34. First plate 34 and second plate 24 may be generally planar and circular, and extend outwardly from shafts 44 and 31 substantially in parallel alignment with one another. In one embodiment, second plate 24 is spaced a predetermined distance "d" from an end 27 of inner shaft 31. Distance d may correspond to a desired, predetermined available reciprocation distance of second plate 24, as described herein. An opposite end of inner shaft 31 may be coupled with a conventional ball coupling apparatus 40, including a base plate 41 and a pin 42. A limiting means 50 may be provided to couple outer shaft 44 with ball coupling apparatus 40, including for example, a connecting member 52 and a set of securing means 51a and 51b. In alternative contemplated embodiments, inner shaft 31 may be coupled to second plate 24, as described herein.

A biasing member 30, which may be a coil spring, will be disposed between first plate 34 and second plate 24 to damp relative movement between outer shaft 44 and inner shaft 31. The respective coupling of outer shaft 44 with neck 14, and inner shaft 31 with ball coupling apparatus 40 allows biasing member 30 to damp relative movement between trailer body 16 and tow vehicle 18, as described herein. In other contemplated embodiments, a plurality of coil springs, or one or more gas springs might be substituted for biasing member 30.

Inner shaft 31 may further include a collar 33, which can restrict movement of outer shaft 44 along inner shaft 31 in one direction. In one contemplated embodiment, biasing member 30 is disposed adjacent collar 33 to support biasing member 30 when compressed, as described herein. Inner shaft 31 may also include an extension 32, defined as that portion of inner shaft 31 between collar 33 and end 27, which may facilitate connecting of collar 33 with shaft 31. In other words, by providing extension 32, a portion of shaft 31 will be available for manipulation or fixturing during, for example, welding of collar 33 to shaft 31. In alternative embodiments, an additional damping member might be positioned between first plate 34 and collar 33.

A plurality of elongate fastening members 22, e.g. bolts, and corresponding nuts 38, may be provided to couple first plate 34 and second plate 24 together. In one contemplated embodiment, six bolts 22 are provided, and are positioned in an annular arrangement defining an inner diameter substantially equal to an outer diameter of biasing member 30. Thus, damping member 30 may be constrained by members 22. Such a design has been found to facilitate retention of biasing member 30 in a desired lateral position relative to line 1 during operation, and in some applications may be more effective than a smaller number of bolts. Registering apertures 35 and 25 may be disposed in plates 34 and 24, respectively, to receive bolts 22. Variable tightening of nuts 38 may be used to vary a degree to which biasing member 30 is pre-compressed, if at all, between plates 34 and 24.

INDUSTRIAL APPLICABILITY

Damping apparatus 12 is operable to damp relative vertical movements between outer shaft 44 and inner shaft 31. Outer shaft 44 will typically be coupled via neck 14 with trailer body 16, and inner shaft 31 will typically be coupled via ball coupling 20 with tow vehicle 18. Accordingly, damping of relative motion between the respective shafts will correspondingly dampen relative motion between trailer body 16 and tow vehicle 18. In this fashion, during operation, transferring of jarring, vibrations, etc. between tow vehicle 18 and trailer body 16 will be reduced as compared to a conventional design wherein the trailer is simply coupled with the tow vehicle.

When trailer 10 encounters a bump, for example, neck 14 may be induced to move upward or downward relative to tow vehicle 18. Motion of neck 14 will in turn be transferred to outer shaft 44, which may move upward or downward against a spring force of damping member 30.

It should be appreciated that the size and spring constant of damping member 30 may be selected in accordance with the loads anticipated to be encountered during operation, or the variance in loading of trailer 10. For example, loading trailer 10 disproportionately fore and aft may affect the relative weight of neck 14 upon damping apparatus 12. Similarly, differing trailer body types may be balanced differently and, accordingly, when at rest neck 14 may exert either of an upward or downward force on damping apparatus 12. Thus, in certain contemplated designs, neck 14 may exert a downward, extensive force on damping member 30 when at rest, whereas in other contemplated designs neck 14 may exert an upward, compressive force on damping member 30 when at rest.

The length of inner shaft 24 might also be selected based on various factors. A relatively longer inner shaft may position neck 14 relatively higher, and thus tilt trailer body 16 slightly backward. Alternatively, a relatively shorter inner shaft may position neck 14 relatively lower, such that trailer body 16 is slightly tilted forward. It is further contemplated that the various components of damping apparatus 12 may be sized and selected such that trailer 10 rests in a relatively neutral, balanced state, exerting relatively little upward or downward force on damping apparatus 12 via neck 14.

The present disclosure thus provides a relatively simple, effective damping apparatus for a trailer. The positioning of damping apparatus 12 externally of, and above inner shaft 31 and outer shaft 44 allows the assembly to be readily inspected for wear or damage and bolts 22 to be adjusted to compress or decompress damping member 30 if desired. This design differs from certain earlier mechanisms wherein portions or the entirety of a trailer damping apparatus were contained within one or more housings, which needed to be disassembled to inspect or adjust the apparatus.

The present description is for illustrative purposes only, and should not be construed to narrow the breadth of the present disclosure in any fashion. Thus, those skilled in the art will appreciate that various modifications might be made to the presently disclosed embodiments without departing from the intended spirit and scope of the present disclosure. For instance, while it is anticipated that in one practical embodiment, as shown in particular in FIGS. 2-3, second plate 24 will essentially be floating above inner shaft 33, this particular design is not necessary. In an alternative contemplated embodiment, inner shaft 33 and second plate 24 may be coupled together. In such a design, second plate 24 would essentially depend downwardly from damping member 30, and would move upward to compress damping member 30 and downward to extend the same.

In still further contemplated embodiments, neck 14 might be coupled with inner shaft 33 rather than with outer shaft 44, and the apparatus designed such that inner shaft 33 reciprocated within outer shaft 44. In such a design, inner shaft 33 would in turn be coupled with an upper plate, while outer shaft 44 would be coupled with a lower plate, with a damping member disposed therebetween. Such a design would essentially be an inversion in the positioning of the damping apparatus, and a reversal of the functions of the outer and inner shafts. Other aspects, features and advantages will be apparent upon further examination of the attached drawing Figures and appended claims.

What is claimed:

1. A gooseneck trailer comprising:
   a trailer body;
   a trailer neck connected with said trailer body;
   a damping apparatus coupled with said trailer neck, said damping apparatus including a shaft and a set of spaced apart coupled plates each of which are configured to move relative to said shaft, wherein one of said plates is coupled with said trailer neck, said damping apparatus further including at least one damping member disposed between said plates to dampen movements between said trailer neck and said shaft, and wherein said shaft includes a first end coupled with a means for releasably coupling said trailer body with a tow vehicle and a second, opposite end, said plates being disposed proximate said second end.

2. The gooseneck trailer of claim 1 wherein said damping apparatus comprises a spring.

3. The gooseneck trailer of claim 2 wherein said shaft comprises an inner shaft, and further comprising an outer shaft coupled with said neck and having an upper end connected with the one of said plates and a lower end, and wherein said spaced apart coupled plates and said spring are positioned vertically above the upper end of said outer shaft.

4. A gooseneck trailer comprising:
a trailer body;
a trailer neck connected with said trailer body, for coupling said trailer body with a tow vehicle;
a damping apparatus coupled with said trailer neck, said damping apparatus including a shaft and a set of spaced apart coupled plates configured to move relative to said shaft, wherein one of said plates is coupled with said trailer neck, said damping apparatus further including at least one damping member disposed between said plates to dampen movements between said trailer neck and said shaft; and
coupling means for releasably coupling said trailer with a tow vehicle;
said shaft being oriented substantially parallel a vertical line and including a first end disposed adjacent said coupling means and a second end opposite said coupling means; and
said damping apparatus being disposed proximate said second end.

5. The gooseneck trailer of claim 4 wherein said first plate is disposed below and coupled with said second plate.

6. The gooseneck trailer of claim 5 wherein said second plate is spaced a predetermined distance from the second end of said shaft.

7. The gooseneck trailer of claim 6 wherein said shaft is an inner shaft, said trailer further comprising an outer shaft coupling said trailer neck with said first plate, said outer shaft being disposed about said inner shaft and movable relative thereto.

8. The gooseneck trailer of claim 7 wherein said damping member is a coil spring.

9. The gooseneck trailer of claim 8 wherein said damping apparatus comprises a plurality of elongate fastening members coupling said first plate with said second plate, said fastening members constraining said spring from displacement transverse to said vertical line.

* * * * *